(12) United States Patent
Xu et al.

(10) Patent No.: US 11,909,281 B2
(45) Date of Patent: Feb. 20, 2024

(54) STATOR-BASED PERMANENT MAGNET FIELD-ENHANCED HYBRID-EXCITATION MOTOR CAPABLE OF OPERATING UNDER MULTIPLE WORKING CONDITIONS AND DRIVE CONTROL METHOD THEREOF

(71) Applicant: Jiangsu University, Jiangsu (CN)

(72) Inventors: Lei Xu, Jiangsu (CN); Xiaohua Zang, Jiangsu (CN); Xiaoyong Zhu, Jiangsu (CN); Danchen Xu, Jiangsu (CN); Shiyue Zheng, Jiangsu (CN); Chao Zhang, Jiangsu (CN)

(73) Assignee: Jiangsu University, Jiangsu (CN)

( * ) Notice: Subject to any disclaimer, the term of this patent is extended or adjusted under 35 U.S.C. 154(b) by 0 days.

(21) Appl. No.: 18/022,991

(22) PCT Filed: Feb. 18, 2022

(86) PCT No.: PCT/CN2022/076738
§ 371 (c)(1),
(2) Date: Feb. 24, 2023

(87) PCT Pub. No.: WO2023/151110
PCT Pub. Date: Aug. 17, 2023

(65) Prior Publication Data
US 2024/0006971 A1    Jan. 4, 2024

(30) Foreign Application Priority Data
Feb. 14, 2022    (CN) .......................... 202210135863.4

(51) Int. Cl.
*H02K 19/12*    (2006.01)
*H02K 21/30*    (2006.01)
(Continued)

(52) U.S. Cl.
CPC ............... *H02K 21/30* (2013.01); *H02K 1/17* (2013.01); *H02K 1/246* (2013.01); *H02K 11/33* (2016.01);
(Continued)

(58) Field of Classification Search
CPC .......... H02P 27/06; H02K 21/30; H02K 1/17; H02K 1/246
See application file for complete search history.

(56) References Cited

U.S. PATENT DOCUMENTS
2019/0319523 A1    10/2019    Jin et al.

FOREIGN PATENT DOCUMENTS
CN    2759034    2/2006
CN    101127461    2/2008
(Continued)

OTHER PUBLICATIONS
"International Search Report (Form PCT/ISA/210) of PCT/CN2022/076738," dated Nov. 10, 2022, pp. 1-4.
(Continued)

*Primary Examiner* — Karen Masih
(74) *Attorney, Agent, or Firm* — JCIPRNET

(57) ABSTRACT

A stator-based permanent magnet field-enhanced hybrid-excitation motor capable of operating under multiple operating conditions and a driving control method thereof are provided. The motor includes a stator, excitation windings, permanent magnets, a rotor, armature windings, and an air gap. The stator is a structure with double-cross-shaped stator modules. A power converter of the motor by four H-bridges is formed. Incoming and outgoing ends of the excitation winding are each connected with a center point of one H-bridge arm, and incoming and outgoing ends of a three-phase winding are each connected with a center point of one H-bridge arm to form an open winding structure; the
(Continued)

H-bridge of the excitation winding is connected in series with a bus of the open winding structure of the three-phase winding; every three bridge arms of the open winding structure form a group; and a switch transistor is arranged between each two groups.

9 Claims, 10 Drawing Sheets

(51) Int. Cl.
  *H02K 1/24* (2006.01)
  *H02K 11/33* (2016.01)
  *H02K 1/17* (2006.01)
(52) U.S. Cl.
  CPC ..... *H02K 2203/09* (2013.01); *H02K 2213/06* (2013.01)

(56) References Cited

FOREIGN PATENT DOCUMENTS

| | | |
|---|---|---|
| CN | 101820192 | 9/2010 |
| CN | 102882459 | 1/2013 |
| CN | 104218763 | 12/2014 |
| CN | 106357144 | 1/2017 |
| CN | 107070014 | 8/2017 |
| CN | 113037156 | 6/2021 |
| CN | 113178962 | 7/2021 |
| CN | 114899955 A * | 8/2022 |
| JP | 2010200482 | 9/2010 |

OTHER PUBLICATIONS

"Written Opinion of the International Searching Authority (Form PCT/ISA/237) of PCT/CN2022/076738," dated Nov. 10, 2022, pp. 1-4.

* cited by examiner

STATOR-BASED PERMANENT MAGNET FIELD-ENHANCED HYBRID-EXCITATION MOTOR CAPABLE OF OPERATING UNDER MULTIPLE WORKING CONDITIONS AND DRIVE CONTROL METHOD THEREOF

CROSS-REFERENCE TO RELATED APPLICATION

This application is a 371 of international application of PCT application serial no. PCT/CN2022/076738, filed on Feb. 18, 2022, which claims the priority benefit of China application no. 202210135863.4, filed on Feb. 14, 2022. The entirety of each of the above mentioned patent applications is hereby incorporated by reference herein and made a part of this specification.

TECHNICAL FIELD

The present disclosure relates to a stator-based permanent magnet motor, and in particular to a stator-based permanent magnet field-enhanced hybrid-excitation motor capable of operating under multiple working conditions and a drive control system thereof, and belongs to the technical field of motors.

DESCRIPTION OF RELATED ART

With the emergence of new rare-earth permanent magnet materials represented by NdFeB and the rapid development of power electronic technology, computer technology, modern control theory, etc., since the 1990s, three new types of stator-based permanent magnet brushless motor systems have emerged, namely doubly salient permanent magnet motor (DSPMM), flux reversal permanent magnet motor (FRPMM), and flux switching permanent magnet motor (FSPM). The permanent magnet and armature winding of the new-type permanent magnet motor are located on the stator, rather than the rotor. Therefore, compared with the rotor of the rotor-based permanent magnet motor, the rotor of the stator-based permanent magnet motor features a simple and solid structure and reliable operation. As a new type of permanent magnet brushless motor, the stator-based permanent magnet brushless motor has the advantages of high efficiency, high power density, and high reliability. It shows unique advantages and good application prospects in electric vehicles, aerospace, flywheel energy storage, and rail transit, etc.

However, because the magnetic field of the NdFeB permanent magnet motor is constant, it is hard to achieve a wide speed range while meeting the requirement of large torque output under the condition of constant bus voltage of the power converter. In other words, there is a contradiction between the constant excitation flux and flux-weakening expansion. Therefore, controllable-flux permanent magnet motor has received extensive attention, and hybrid-excitation permanent magnet motor, memory motor and leakage-controllable permanent magnet motor have been proposed. The hybrid-excitation permanent magnet motor combines the characteristics of permanent magnet motor and electrically excited motor. It can achieve the purposes of permanent magnet field enhancement and flux-weakening expansion of the motor through direct current (DC) excitation, and has become one of the research focuses of the new-type permanent magnet motor. However, because the electrical excitation flux of the hybrid-excitation permanent magnet motor is smaller than that of the permanent magnet motor, the magnetic field adjustment ability of the hybrid-excitation permanent magnet motor is limited, which is only 10-30%. In addition, higher DC is often required to improve the flux-weakening range. This will increase copper loss, reduce motor efficiency, cause tangential force and torque fluctuations, affect motor operation stability, increase iron loss, and lead to radial force fluctuations, causing vibration and noise. Therefore, it is of great theoretical significance and economic value to design and develop a new hybrid-excitation motor structure to improve the efficiency and dynamic performance of the motor.

SUMMARY

In order to solve the problems of the existing hybrid-excitation stator-based permanent magnet motor, an objective of the present disclosure is to propose a stator-based permanent magnet field-enhanced hybrid-excitation motor capable of operating under multiple working conditions. In the present disclosure, an excitation magnetic field generated by excitation windings and a permanent magnet field generated by permanent magnets together constitute an air gap field, and an air gap flux density is controlled by controlling the magnitude and direction of a current applied to the excitation windings. In this way, the air gap field is adjustable, and the motor can operate under multiple working conditions. In addition, the design further reduces torque ripple, improves power density, achieves high-efficiency and low-torque-ripple operation of the motor, and improves the dynamic working performance of the motor.

The present disclosure adopts the following technical solutions. The stator-based permanent magnet field-enhanced hybrid-excitation motor capable of operating under multiple operating conditions includes a stator (1), excitation windings (2), permanent magnets a (3), permanent magnets b (4), permanent magnets c (5), permanent magnets d (6), a rotor (7), armature windings a (8), armature windings b (9), and an air gap (10), where the stator (1) is a structure with double-cross-shaped stator modules; the permanent magnets a (3) are each embedded between ends of two adjacent outer stator teeth of the stator (1), and the permanent magnets b (4) are each embedded between ends of two adjacent inner stator teeth of the stator (1); the permanent magnets c (5) and the permanent magnets d (6) are respectively embedded between ends of yokes of two adjacent double-cross-shaped stator modules; the excitation windings (2) are wound on a yoke of the stator (1); the armature windings a (8) and the armature windings b (9) are respectively wound on two stator teeth of the stator (1) close to a rotor core; the air gap (10) is arranged between an inner circle of the stator (1) and an outer circle of the rotor (7); and an axis of the stator (1) coincides with a rotation axis of the rotor (7).

Further, a stator core of the stator (1) is laminated by silicon steel sheets, and a part of the stator facing the rotor is stator teeth with a width of a; and the rotor core of the rotor (7) is laminated by silicon steel sheets, and has a salient pole structure with a rotor teeth width of (1-1.8)α.

Further, the excitation windings (2) are wound radially, and the armature windings a (8) and the armature windings b (9) are wound tangentially.

Further, the permanent magnets a (3) and the permanent magnets b (4) have the same magnetizing direction; the permanent magnets c (5) and the permanent magnets d (6) have the same magnetizing direction; the magnetizing direction of the permanent magnets a (3) and the permanent magnets b (4) is opposite to the magnetizing direction of the permanent magnets c (5) and the permanent magnets d (6); and the permanent magnets b (4) have a width of (0.6-1.2)α in a non-magnetizing direction.

Further, the permanent magnets c (5) and the permanent magnets d (6) have a height equal to a height of the yoke of the stator (1), and the yoke of the stator (1) has a width of (0.5-1)α.

Further, a magnetic flux generated by the excitation windings (2) is able to participate in air gap field excitation, control a permanent magnet flux to enter an air gap field for excitation, and change a reluctance of a main magnetic circuit to realize variable-reluctance control.

Further, the motor has a fault-tolerant operation capability; when the permanent magnets a (3), the permanent magnets b (4), the permanent magnets c (5) and the permanent magnets d (6) are demagnetized or the armature windings a (8) and the armature windings b (9) fail, the excitation windings are able to act as armature windings; and when the permanent magnets are fully demagnetized and the excitation windings fail, the motor is able to operate as a switched reluctance motor (SRM).

The present disclosure further provides a driving control method of a stator-based permanent magnet field-enhanced hybrid-excitation motor capable of operating under multiple operating conditions, which includes: forming a power converter of the motor by four H-bridges, where incoming and outgoing ends of an excitation winding (2) are each connected with a center point of one H-bridge arm, and incoming and outgoing ends of a three-phase winding are each connected with a center point of one H-bridge arm to form an open winding structure; the H-bridge of the excitation winding (2) is connected in series with a bus of the open winding structure of the three-phase winding; every three bridge arms of the open winding structure form a group; and a switch transistor TTS is arranged between each two groups.

The driving control method also includes: implementing operation under multiple working conditions, where when the motor operates as a permanent magnet synchronous motor (PMSM), lower tubes of a group of three bridge arms of the open winding structure are communicated, such that the outgoing ends of the three-phase winding are connected together, and the switch transistor TTS is opened; and when the motor operates as an SRM, the switch transistor TTS is closed, where an upper tube of the bridge arm connected with the incoming end of each phase winding and a lower tube of the bridge arm connected with the outgoing end of each phase winding form a power converter of the SRM, and an upper tube of the bridge arm connected with the outgoing end of each phase winding and a lower tube of the bridge arm connected with the incoming end of each phase winding only use diodes connected in subtractive series thereof for freewheeling.

Furthermore, the driving control method further includes: controlling, by one H-bridge alone, an excitation current; and inputting a positive or negative excitation current by controlling four switch transistors to be on, so as to realize magnetic field enhancement or demagnetization of the motor; inputting, when the motor has an armature winding fault and a demagnetization fault, a single-phase alternating current (AC) into the excitation winding through the H-bridge of the excitation winding to form a single-phase AC magnetomotive force (MMF) for working with other phase without a fault, such that the motor operates in a fault-tolerant mode; and when the excitation winding fails and a permanent magnet is demagnetized, the switch transistor TTS is closed, and the power converter of the open winding structure operates in an SRM control mode.

The present disclosure has the following beneficial effects.

1. When a negative current is input into the excitation winding, the magnetic fields of the permanent magnets 3, 5 and 6 are pulled into the air gap, and excitation of the permanent magnets and electrical excitation of the excitation winding together create the air gap field. This design realizes the multiplication regulation of the air gap field and improves the power density of the motor.

2. The permanent magnets and windings are provided on the stator, so the rotor has the advantages of simple structure, easy heat dissipation, and reliable operation.

3. The stator is modularized. An excitation coil is wound around the yoke of the double-cross-shaped stator module, and an armature coil is wound around the tooth part of the double-cross-shaped stator module close to the rotor. The design avoids the overlapping of the windings at the motor end, and is easy for winding.

4. By introducing the permanent magnets, the motor can operate as a PMSM, which reduces the torque ripple of the motor and improves the working performance of the motor.

5. When the armature winding fails, the excitation winding can be used as an armature winding, which improves the fault-tolerant performance of the motor, and allows the motor to operate as an SRM.

6. Compared with the traditional SRM, the motor of the present disclosure introduces the permanent magnets and the excitation winding, thereby having the advantages of high torque and wide speed regulation range of the SRM, as well as high power density and low torque ripple.

DESCRIPTION OF THE EMBODIMENTS

Figure 1:
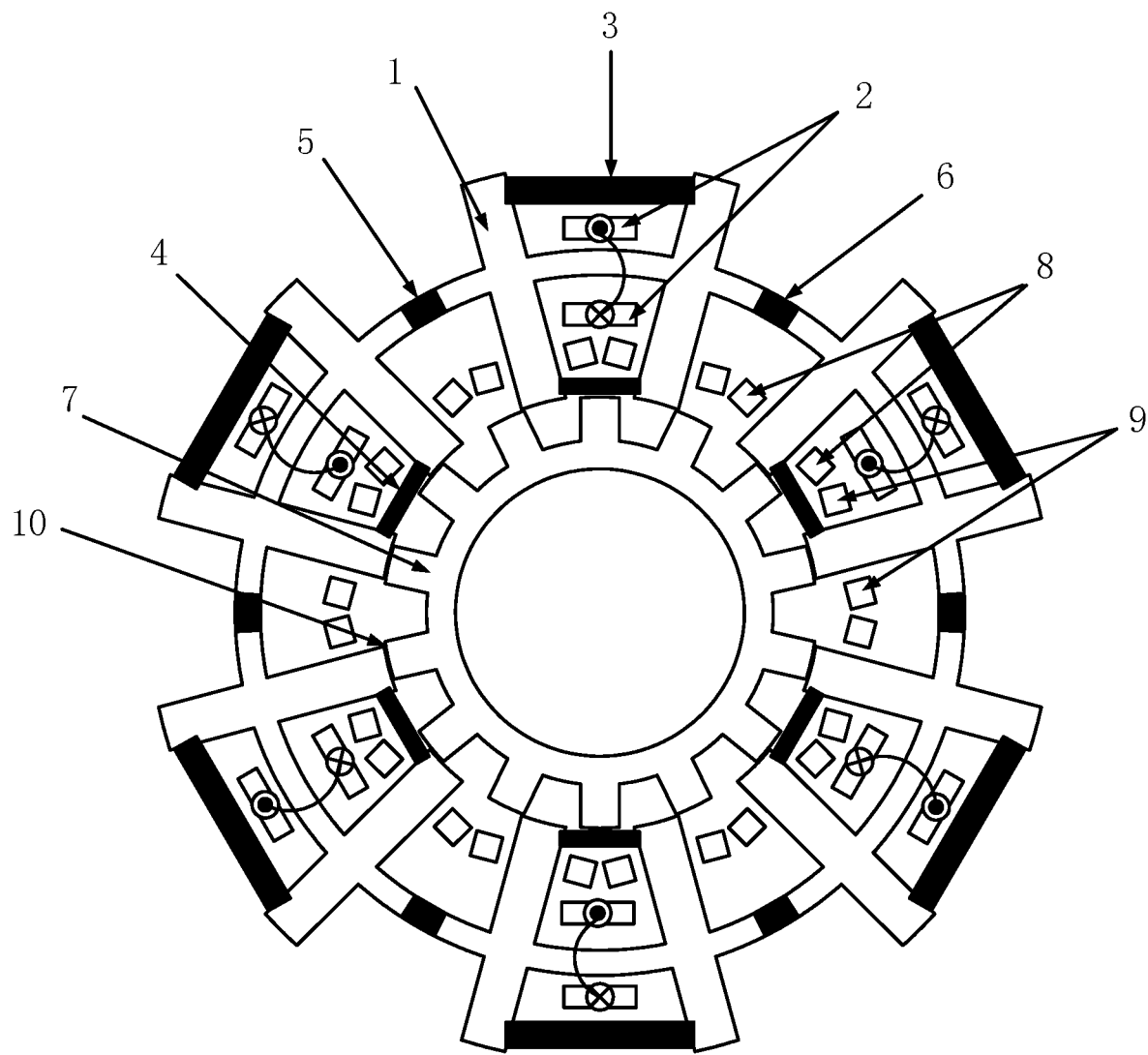
FIG. 1 is a structural diagram of a stator-based permanent magnet hybrid-excitation motor according to the present disclosure.
Figure 2:
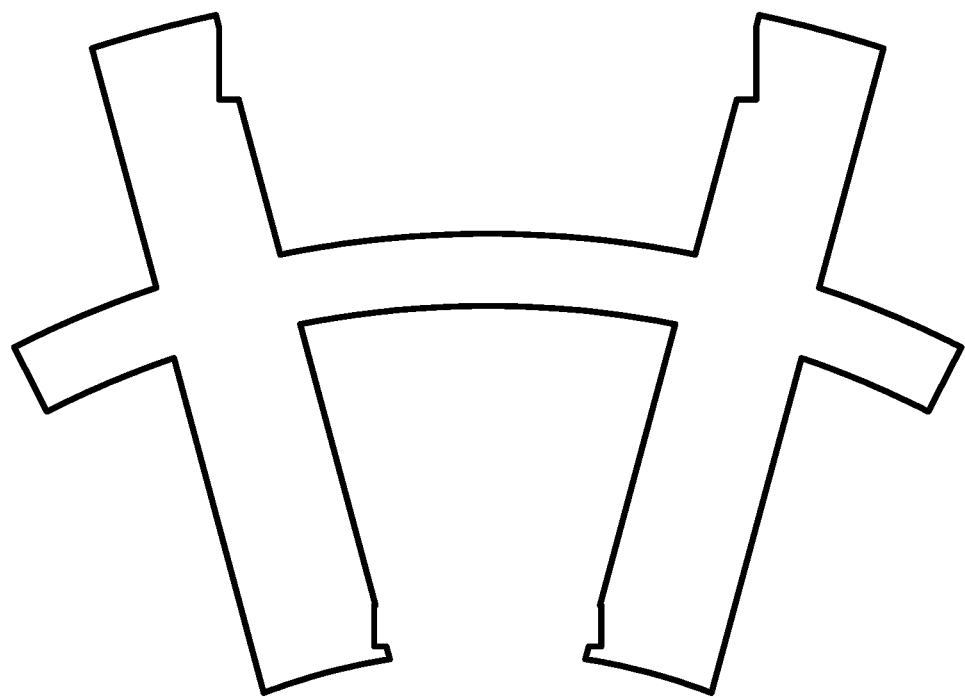
FIG. 2 is a structural diagram of a double-cross-shaped stator tooth part of the stator-based permanent magnet hybrid-excitation motor according to the present disclosure.

The present disclosure provides a stator-based permanent magnet field-enhanced hybrid-excitation motor capable of operating under multiple operating conditions. As shown in FIG. 1 and FIG. 2, the motor includes double-cross-shaped stator parts, an excitation winding, permanent magnets, armature windings, and a salient rotor core. The permanent magnets are respectively embedded between ends of two upper stator teeth and between ends of two lower stator teeth of each double-cross-shaped stator part, and between left and right ends of yokes of each two double-cross-shaped stator parts. The permanent magnets at the upper and lower ends have a same magnetizing direction, and the permanent magnets at the left and right ends have a same magnetizing direction. The magnetizing direction of the permanent magnets at the upper and lower ends is opposite to that of the permanent magnets at the left and right ends. An excitation coil is wound on the yoke of the double-cross-shaped stator part and wound radially. Armature coils are respectively wound on two stator teeth of the double-cross-shaped stator part close to the rotor core and wound tangentially. A DC is input into the excitation winding, and the excitation winding is also called a DC winding. An AC is input into the armature winding, and the armature winding is also called an AC winding. An air gap is formed between an outer circle of the rotor core and an inner circle of the stator core. The double-cross-shaped stator part and salient rotor core are laminated by silicon steel sheets. In the present disclosure, the permanent magnets are made of NdFeB.

Figure 3:
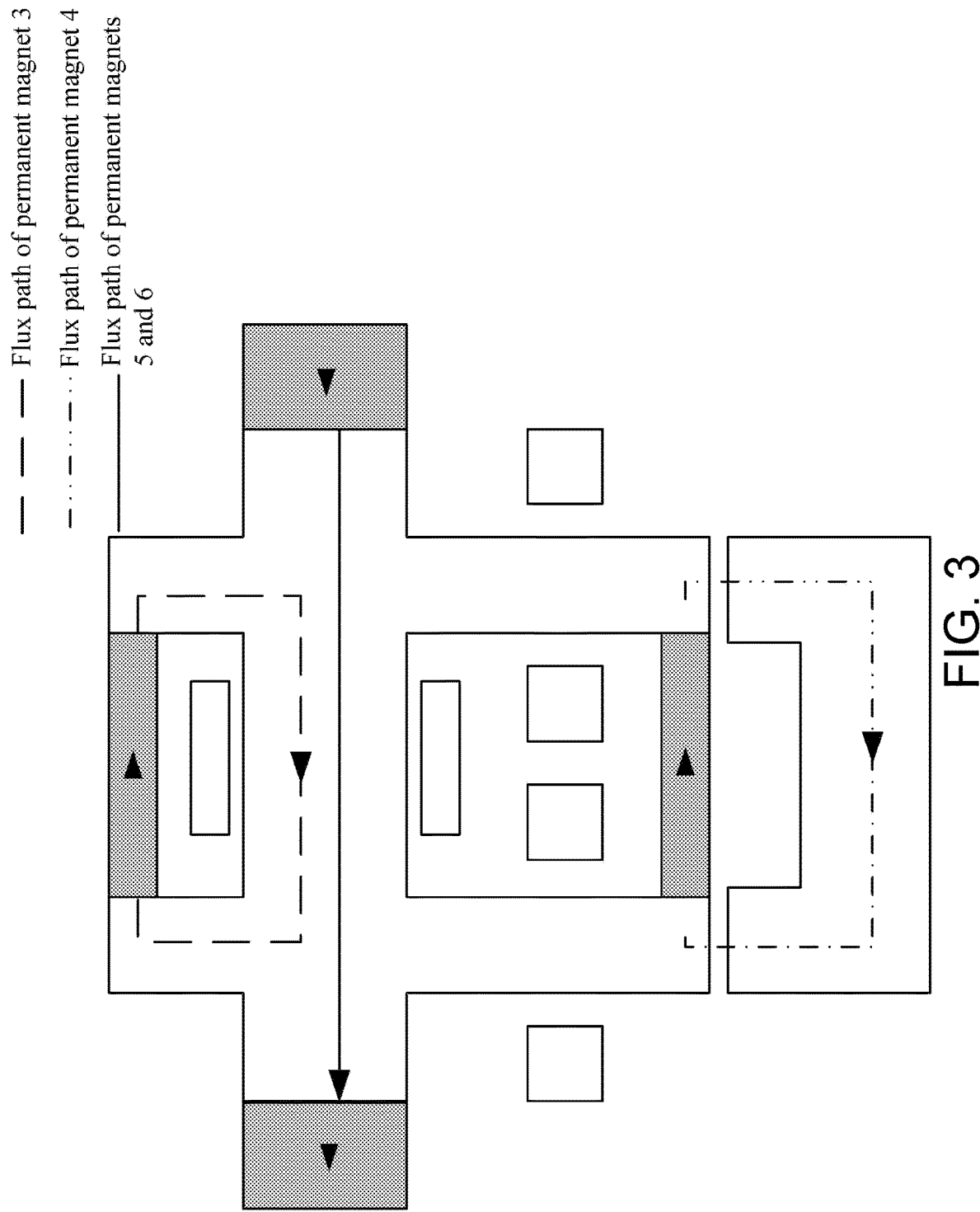
FIG. 3 is a distribution diagram of magnetic field lines when the stator-based permanent magnet hybrid-excitation motor is unloaded and an excitation winding is not energized according to the present disclosure.

Condition 1 is illustrated with reference to FIG. 3. In this condition, the motor is unloaded, and the excitation winding 2 is not energized. The magnetizing direction of the permanent magnets 5 and 6 is counterclockwise, and the magnetic field lines do not pass through the air gap, but only pass through the yoke of the double-cross-shaped stator tooth part. The magnetizing direction of the permanent magnets 3 and 4 is clockwise, opposite to that of the permanent magnets 5 and 6. The magnetic field lines of the permanent magnet 3 are closed after passing through the stator teeth and stator yoke. Because of the large reluctance of the stator yoke, most of the magnetic field lines of the permanent magnet 4 are closed after passing through the air gap and rotor, and a few thereof are closed after passing through the stator teeth and stator yoke. This is consistent with the operation mode of a traditional switched reluctance motor (SRM).

Figure 4:
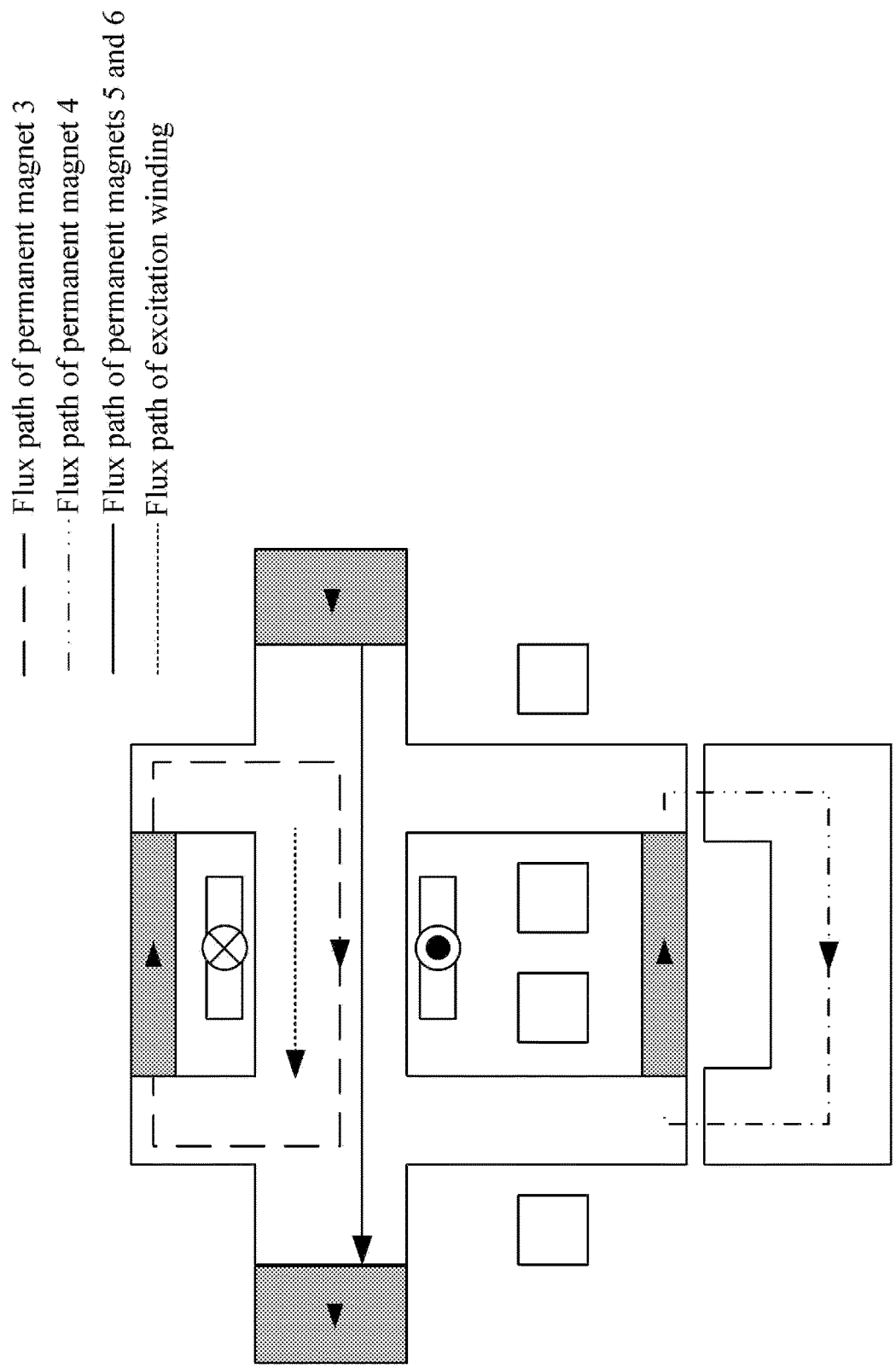
FIG. 4 is a distribution diagram of magnetic field lines when the stator-based permanent magnet hybrid-excitation motor is unloaded and a positive current is input into the excitation winding according to the present disclosure.

Condition 2 is illustrated with reference to FIG. 4. The difference between this condition and condition 1 is that a positive current is input into the excitation winding 2. The electromagnetic field and the magnetic field of the permanent magnets 5 and 6 attract each other. Therefore, the electromagnetic field lines only pass through the stator yoke, and the magnetic field lines of the permanent magnets 5 and 6 do not pass through the air gap, but only pass through the yoke of the double-cross-shaped stator tooth part. The magnetic field lines of the permanent magnet 3 are closed after passing through the stator teeth and stator yoke. Because of the larger reluctance of the stator yoke, the magnetic field lines of the permanent magnet 4 are basically closed after passing through the air gap and rotor, and almost not after passing through the stator teeth and stator yoke. In this condition, the magnetic density of the air gap does not increase significantly.

Figure 5:
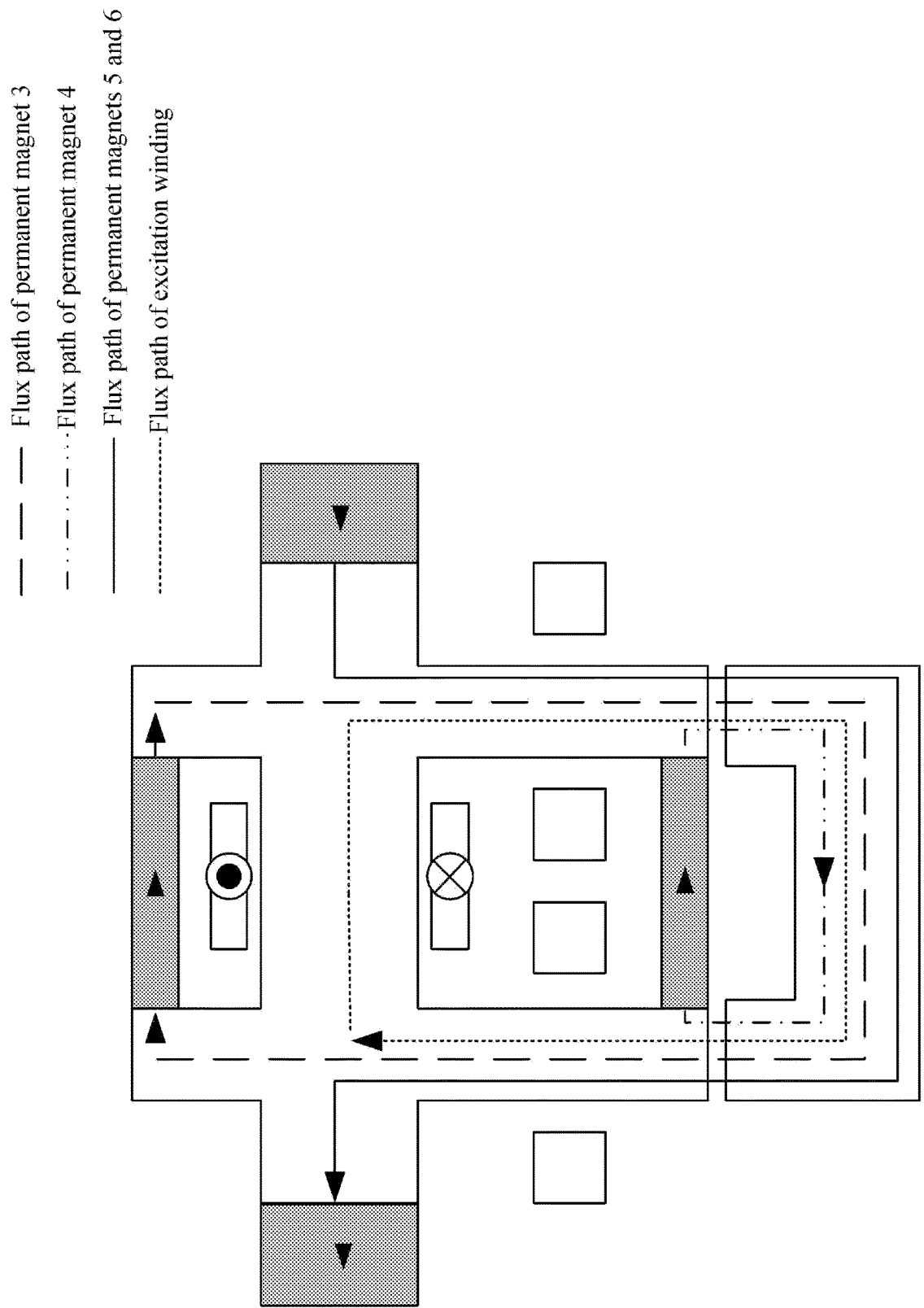
FIG. 5 is a distribution diagram of magnetic field lines when the stator-based permanent magnet hybrid-excitation motor is unloaded and a negative current is input into the excitation winding according to the present disclosure.

Condition 3 is illustrated with reference to FIG. 5. The difference between this condition and condition 1 is that a negative current is input into the excitation winding 2. The electromagnetic field and the permanent magnetic field of the permanent magnets 5 and 6 repel each other, and small magnetic fields repel each other in the left and right half of the double-cross-shaped stator part. Therefore, the electromagnetic field lines are closed after passing through the stator yoke, stator teeth, air gap and rotor, and the magnetic fields of the permanent magnets 3, 5 and 6 are pulled into the air gap by the electric excitation instead of passing through the yoke of the double-cross-shaped stator tooth part. The air gap field is composed of an electromagnetic field, a magnetic field generated by the permanent magnets 3 and 4, and a magnetic field generated by the permanent magnets 5 and 6. The design realizes the multiplication regulation of the air gap field, obviously increases the air gap flux density, improves the power density of the motor, and reduces the torque ripple.

Figure 6:
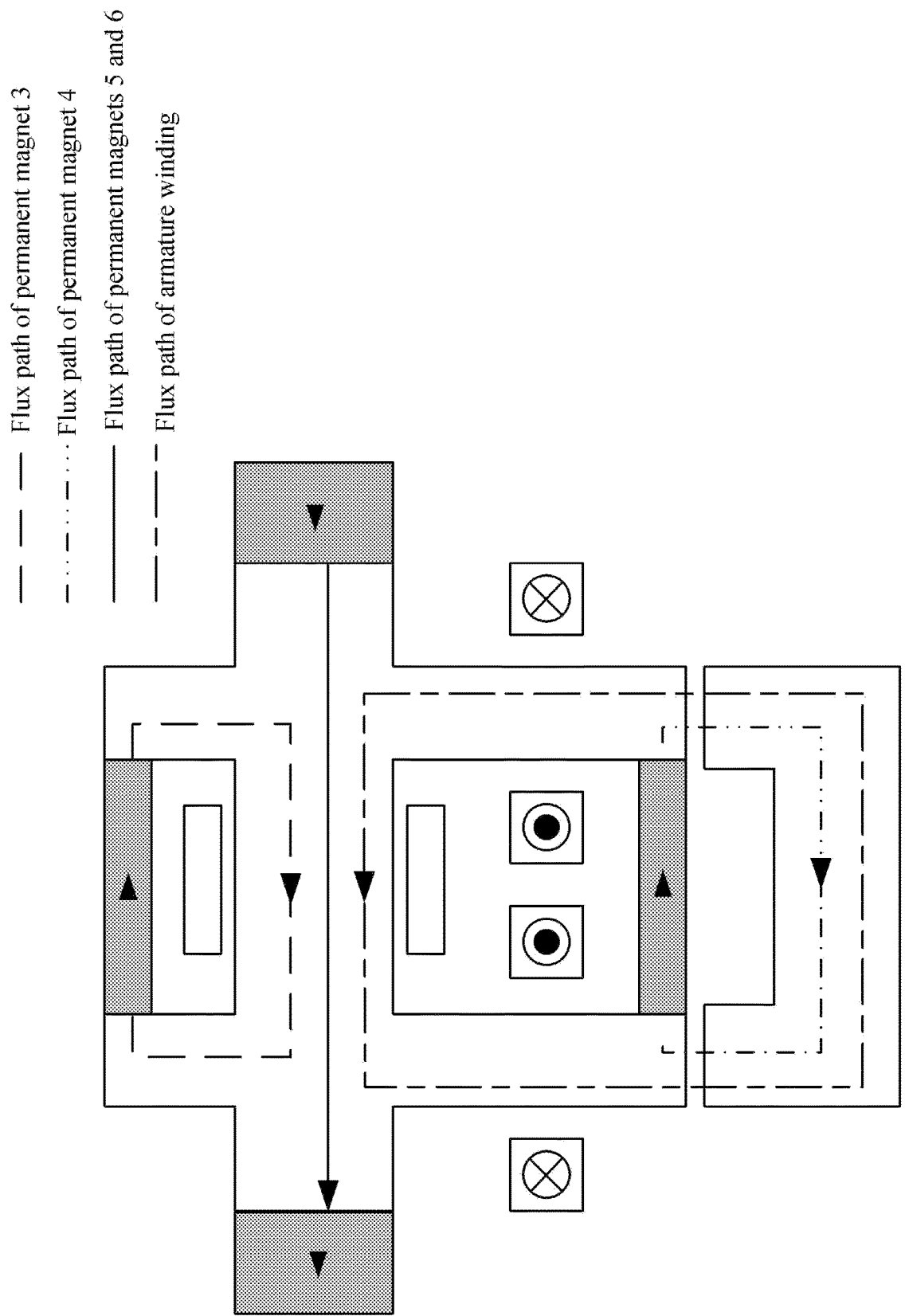
FIG. 6 is a distribution diagram of magnetic field lines when the stator-based permanent magnet hybrid-excitation motor is loaded and an excitation winding is not energized according to the present disclosure.

Condition 4 is illustrated with reference to FIG. 6. The difference between this condition and condition 1 is that an AC is applied to the armature windings 8 and 9. Compared with condition 1, the magnetic flux paths of the permanent magnets 3, 4, 5 and 6 are basically unchanged. The armature reaction flux passes through the air gap and rotor. The armature reaction field interacts with the magnetic field of the permanent magnet 4 to generate a torque, so as to make the motor rotate. If the amplitude of the AC is 10 A, the torque can reach 3.8 Nm.

Figure 7:
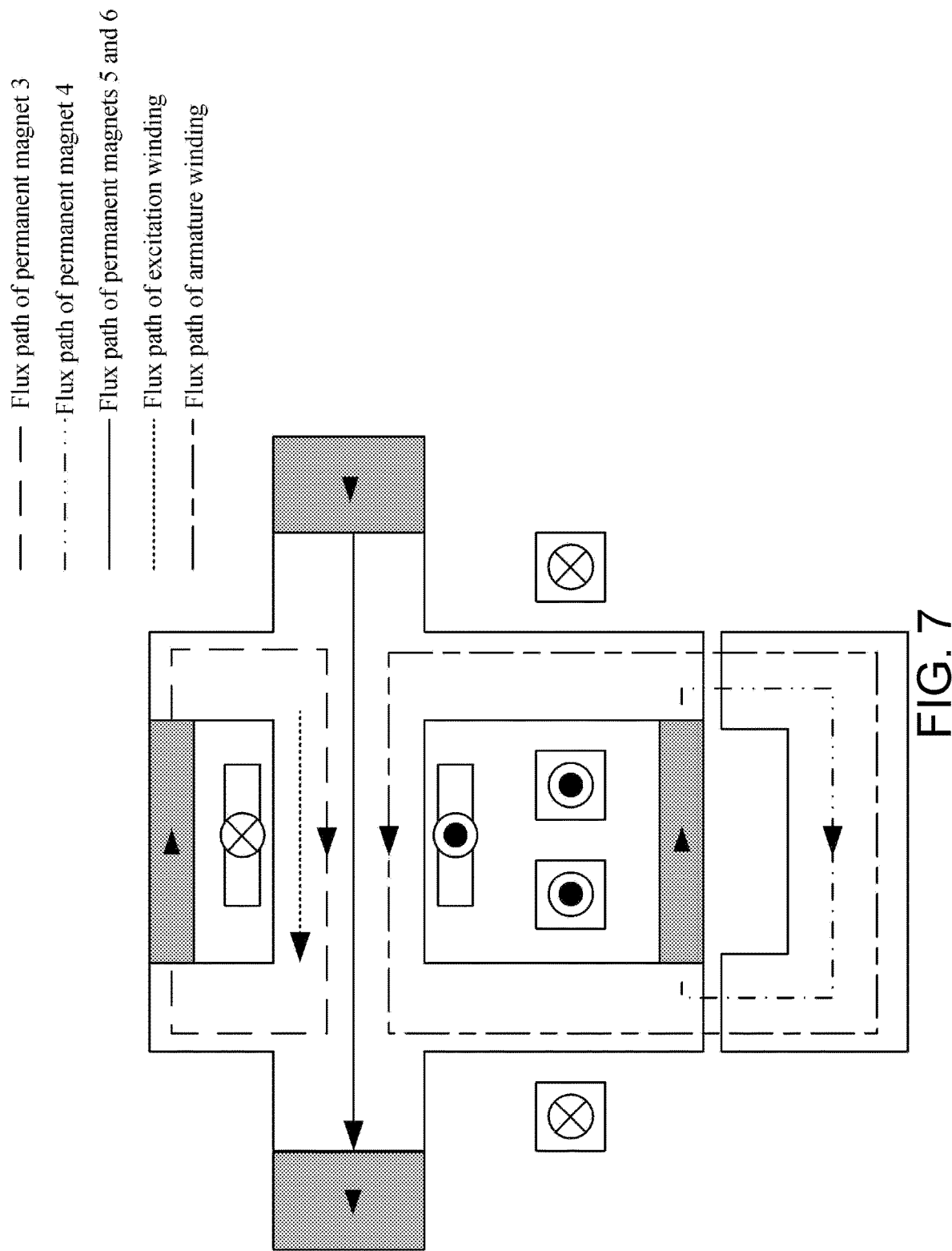
FIG. 7 is a distribution diagram of magnetic field lines when the stator-based permanent magnet hybrid-excitation motor is loaded and a positive current is input into the excitation winding according to the present disclosure.

Condition 5 is illustrated with reference to FIG. 7. The difference between this condition and condition 2 is that an AC is applied to the armature windings 8 and 9. Compared with condition 2, the magnetic flux paths of the permanent magnets 3, 4, 5 and 6 are basically unchanged. The armature reaction flux passes through the air gap and rotor. The armature reaction field interacts with the magnetic field of the permanent magnet 4 to generate a torque, so as to make the motor rotate, and interacts with the electromagnetic field to make a small part of the electromagnetic field lines pass through the air gap and rotor instead of passing through the stator yoke. Compared with condition 4, in this condition, the air gap flux density is slightly increased, and the torque is also slightly increased.

Figure 8:
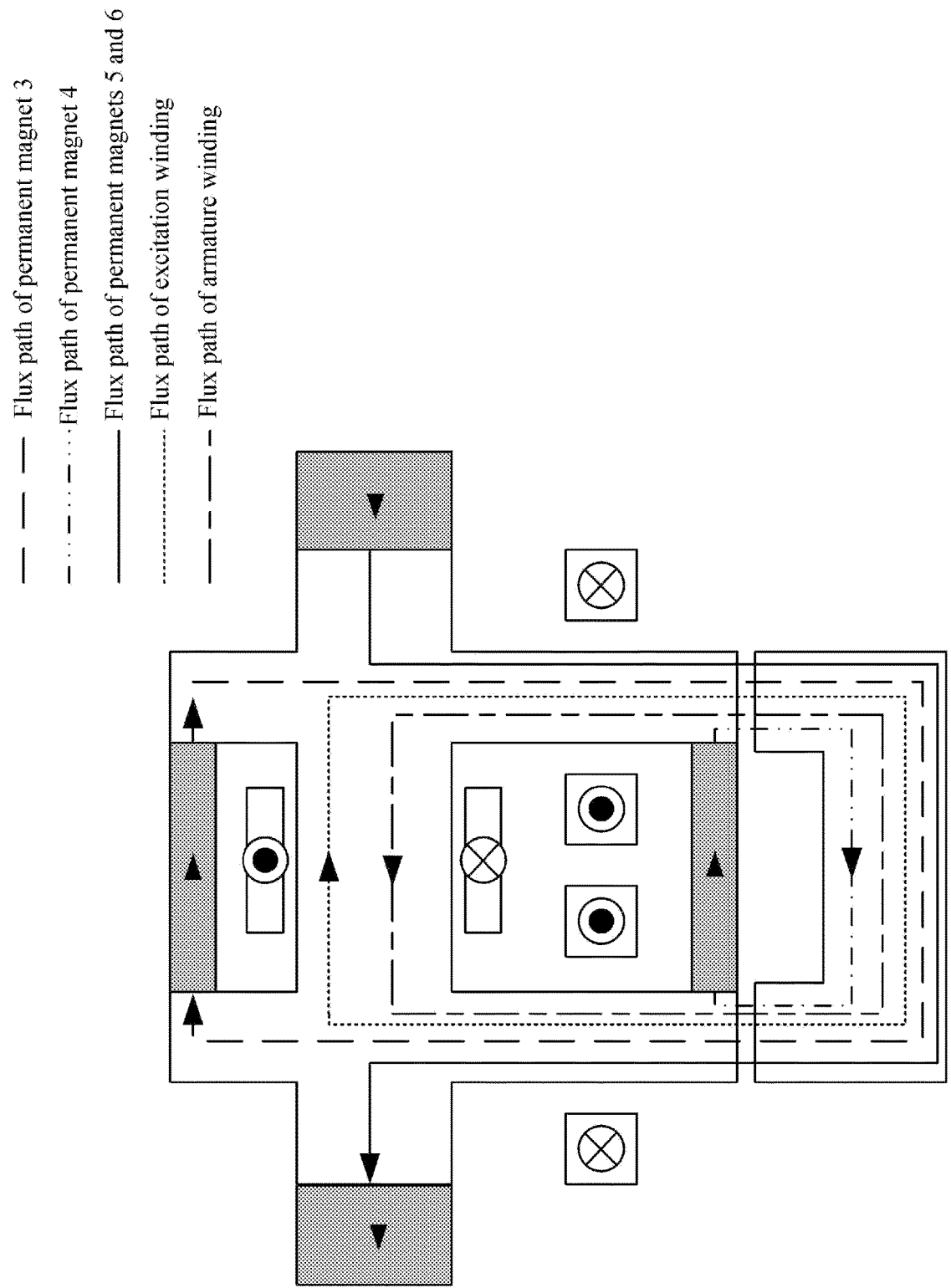
FIG. 8 is a distribution diagram of magnetic field lines when the stator-based permanent magnet hybrid-excitation motor is loaded and a negative current is input into the excitation winding according to the present disclosure.

Condition 6 is illustrated with reference to FIG. 8. The difference between this condition and condition 3 is that an AC is applied to the armature windings 8 and 9. In this condition, the air gap field is composed of an armature reaction field, an electromagnetic field, a magnetic field generated by the permanent magnets 3 and 4, and a magnetic field generated by the permanent magnets 5 and 6. The armature reaction field interacts with the magnetic field of the permanent magnet 4 to generate a torque, so as to make the motor rotate. Compared with condition 4, in this condition, the air gap flux density is significantly increased, and the torque is also significantly increased. If the amplitude of AC is 10 A, the torque can reach 11.75 Nm. The power density of the motor is increased, and the torque ripple thereof is reduced. With the adjustment of the excitation current and armature current, the air gap flux density of the motor can be reduced, such that the motor can operate in a wider speed range. This shows that the motor of the present disclosure has the advantages of the SRM and the stator-based permanent magnet motor.

Figure 9:
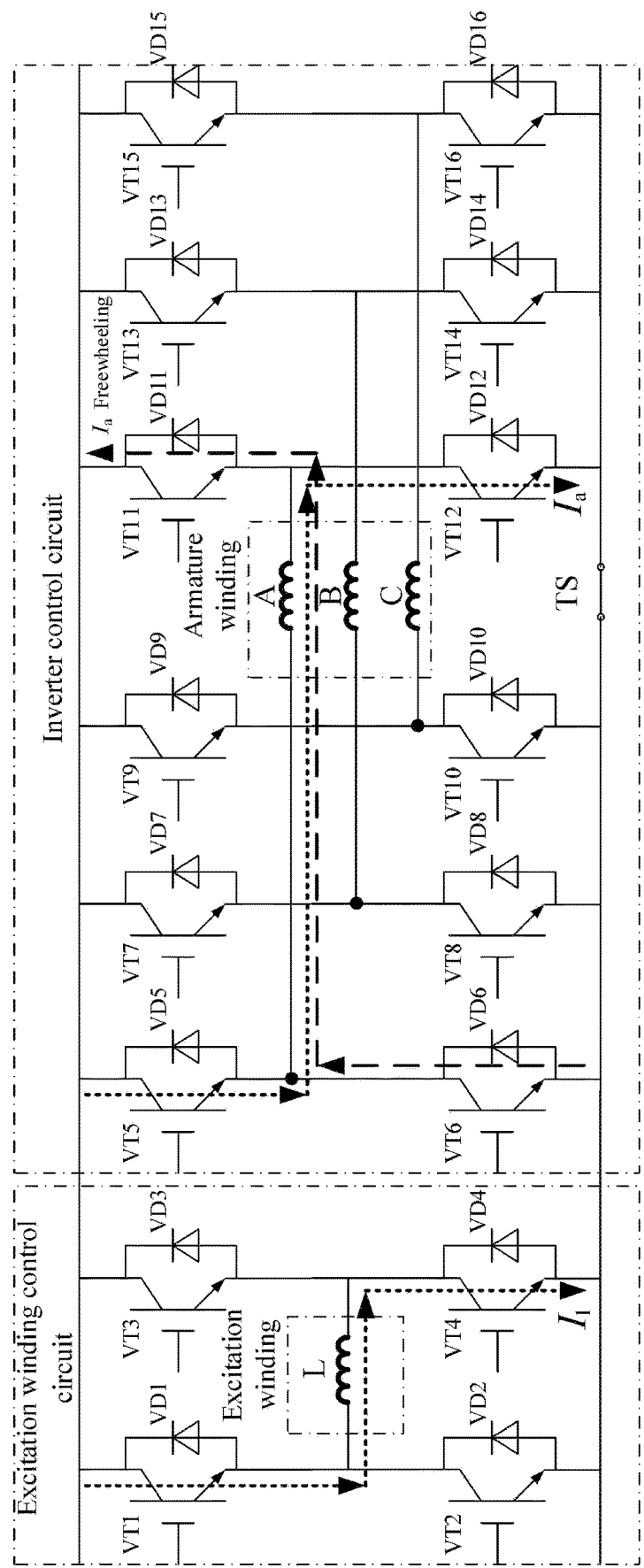
FIG. 9 is a partial diagram of a control circuit when the stator-based permanent magnet hybrid-excitation motor operates as an SRM according to the present disclosure.

A partial control circuit of the motor operating as an SRM is illustrated with reference to FIG. 9. The left side of the figure shows an excitation winding control circuit. The DC flows through the excitation winding via VT1, and then returns to a power terminal via VT4. The right side of the figure shows an inverter control circuit, where a switch TS is closed. Taking phase A as an example, the AC flows through the phase A winding via VT5, and then returns to the power terminal via VT12. The control strategies of the SRM include angle position control (APC), current chopping control (CCC), and direct instantaneous torque control (DITC). When the motor works at a high speed, the APC strategy can be used, that is, the torque and speed can be adjusted by adjusting the opening angle and closing angle of a main switch device of the SRM. When the motor works at a low speed, the CCC strategy can be used, that is, to keep the opening angle and closing angle of the motor unchanged. The peak current can be adjusted by controlling the chopping current so as to adjust the torque and speed of the motor. The DITC strategy can be used when high requirements are put forward for dynamic performance, that is, an instantaneous torque following a reference torque at each moment is directly controlled. According to the deviation between the instantaneous torque and the reference torque, a negative, zero or positive voltage is provided for the power converter to generate switching signals for all excitation phases of the motor, so as to realize the adjustment of the torque and speed of the motor. The motor of the present disclosure can also perform magnetization or demagnetization by controlling the direction of the excitation current, so as to increase the power or speed of the motor.

Figure 10:
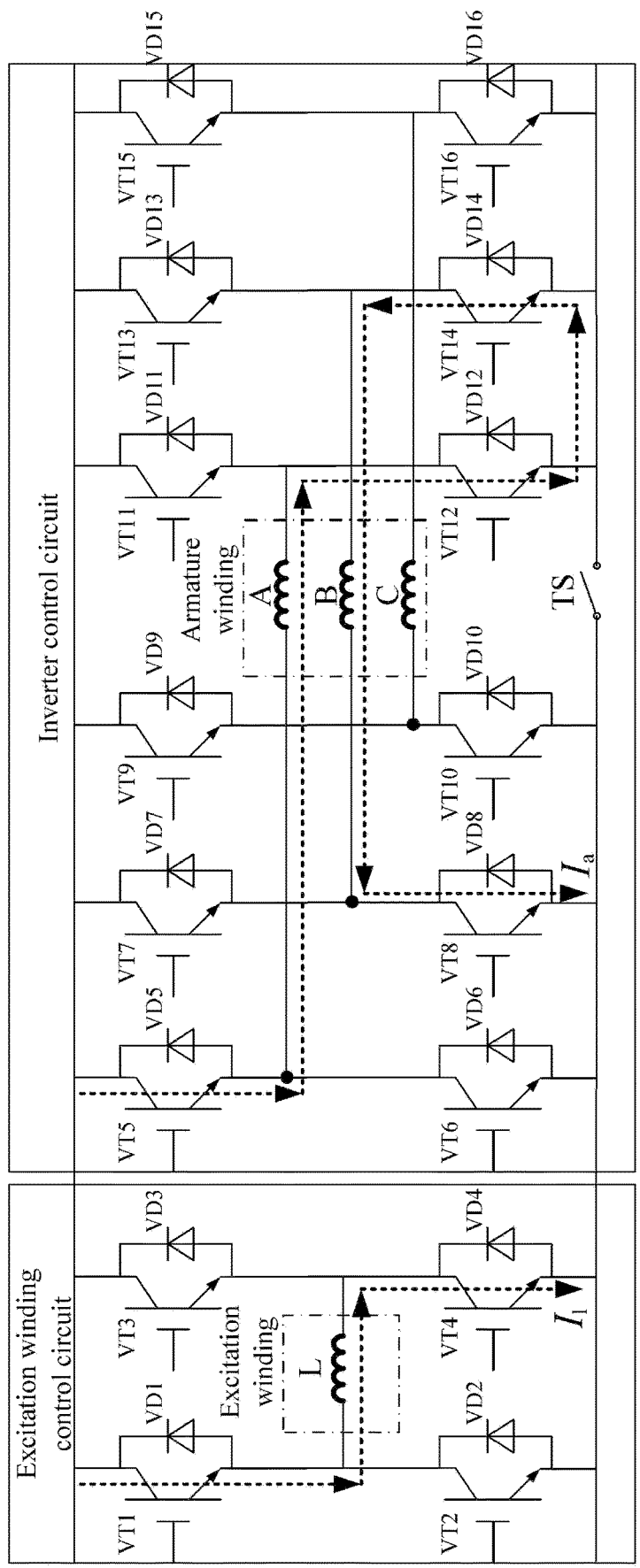
FIG. 10 is a partial diagram of the control circuit when the stator-based permanent magnet hybrid-excitation motor operates as a permanent magnet synchronous motor (PMSM) according to the present disclosure.

A partial control circuit of the motor operating as a permanent magnet synchronous motor (PMSM) is illustrated with reference to FIG. 10. Unlike the SRM mode, the switch TS is open in the PMSM mode. Taking phase A as an example, the AC flows through the phase A winding via VT5, flows through the phase B winding via VT12 and VT14, and finally returns to the power terminal via VT8. The PMSM mainly adopts vector control. The three-phase stator current vectors of the motor are transformed into $i_d$ and $i_q$ in a two-phase rotation coordinate system oriented by a rotor flux through coordinate transformation. That is, a three-phase stator coordinate system (A,B,C-coordinate system) is converted into a two-phase stationary stator coordinate system through Clark transformation ($\alpha,\beta$-coordinate system), and the two-phase stationary stator coordinate system is converted into the two-phase rotation coordinate system (d,q-coordinate system) through Park transformation. It is supposed that the d axis coincides with a rotor flux vector, and the q axis turns 90° counterclockwise. In this way, the two-phase synchronous rotation coordinate system is a synchronous rotation orthogonal coordinate system oriented according to the rotor flux. Based on the control idea of a DC motor, the torque and speed of the PMSM are controlled. The motor of the present disclosure can also control the reluctance of the circuit by controlling the direction of the excitation current, thereby adjusting the inductance of the winding, and finally adjusting the power of the motor.

The motor of the present disclosure is suitable for multiple operating conditions, namely the SRM mode and the PMSM mode. The air gap field can include the magnetic field generated by the permanent magnet, the electromagnetic field generated by the excitation winding and the armature reaction field generated by the armature winding. The air gap field can realize multiplication regulation, which provides the motor with the advantages of high torque and wide speed range of the SRM and the advantages of high power density and low torque ripple of the stator-based permanent magnet motor.

What is claimed is:

1. A stator-based permanent magnet field-enhanced hybrid-excitation motor capable of operating under multiple operating conditions, comprising: a stator, excitation windings, first permanent magnets, second permanent magnets, third permanent magnets, fourth permanent magnets, a rotor, first armature windings, second armature windings, and an air gap, wherein the stator is a structure with double-cross-shaped stator modules; the first permanent magnets are each embedded between ends of two adjacent outer stator teeth of the stator, and the second permanent magnets are each embedded between ends of two adjacent inner stator teeth of the stator; the third permanent magnets and the fourth permanent magnets are respectively embedded between ends of yokes of two adjacent double-cross-shaped stator modules; the excitation windings are wound on a yoke of the stator; the first armature windings and the second armature windings are respectively wound on two stator teeth of the stator close to a rotor core; the air gap is arranged between an inner circle of the stator and an outer circle of the rotor; and an axis of the stator coincides with a rotation axis of the rotor.

2. The stator-based permanent magnet field-enhanced hybrid-excitation motor capable of operating under multiple operating conditions according to claim 1, wherein a stator core of the stator is laminated by silicon steel sheets, and a part of the stator facing the rotor is stator teeth with a width of a; and the rotor core of the rotor is laminated by silicon steel sheets, and has a salient pole structure with a rotor teeth width of (1-1.8)α.

3. The stator-based permanent magnet field-enhanced hybrid-excitation motor capable of operating under multiple operating conditions according to claim 1, wherein the excitation windings are wound radially, and the first armature windings and the second armature windings are wound tangentially.

4. The stator-based permanent magnet field-enhanced hybrid-excitation motor capable of operating under multiple operating conditions according to claim 2, wherein the first permanent magnets and the second permanent magnets have the same magnetizing direction; the third permanent magnets and the fourth permanent magnets have the same magnetizing direction; the magnetizing direction of the first permanent magnets and the second permanent magnets is opposite to the magnetizing direction of the third permanent magnets and the fourth permanent magnets; and the second permanent magnets have a width of (0.6-1.2)α in a non-magnetizing direction.

5. The stator-based permanent magnet field-enhanced hybrid-excitation motor capable of operating under multiple operating conditions according to claim 2, wherein the third permanent magnets and the fourth permanent magnets have a height equal to a height of the yoke of the stator, and the yoke of the stator has a width of (0.5-1)α.

6. The stator-based permanent magnet field-enhanced hybrid-excitation motor capable of operating under multiple operating conditions according to claim 1, wherein a magnetic flux generated by the excitation windings participates in air gap field excitation, controls a permanent magnet flux to enter an air gap field for excitation, and changes a reluctance of a main magnetic circuit to realize variable-reluctance control.

7. The stator-based permanent magnet field-enhanced hybrid-excitation motor capable of operating under multiple operating conditions according to claim 1, wherein the motor has a fault-tolerant operation capability; when the first permanent magnets, the second permanent magnets, the third permanent magnets and the fourth permanent magnets are demagnetized or the first armature windings and the second armature windings fail, the excitation windings act as armature windings; and when the permanent magnets are fully demagnetized and the excitation windings fail, the motor operates as a switched reluctance motor.

8. A driving control method of a stator-based permanent magnet field-enhanced hybrid-excitation motor capable of operating under multiple operating conditions, comprising: forming a power converter of the motor by four H-bridges, wherein incoming and outgoing ends of an excitation winding are each connected with a center point of one H-bridge arm, and incoming and outgoing ends of a three-phase winding are each connected with the center point of one H-bridge arm to form an open winding structure; the H-bridge of the excitation winding is connected in series with a bus of the open winding structure of the three-phase winding; every three bridge arms of the open winding structure form a group; and a switch transistor is arranged between each two groups; and implementing operation under multiple working conditions, wherein when the motor operates as a permanent magnet synchronous motor, lower tubes of a group of three bridge arms of the open winding structure are communicated, such that the outgoing ends of the three-phase winding are connected together, and the switch transistor is opened; and when the motor operates as a switched reluctance motor, the switch transistor is closed, wherein an upper tube of the bridge arm connected with the incoming end of each phase winding and a lower tube of the bridge arm connected with the outgoing end of each phase winding form a power converter of the switched reluctance motor, and an upper tube of the bridge arm connected with the outgoing end of each phase winding and a lower tube of the bridge arm connected with the incoming end of each phase winding only use diodes connected in subtractive series thereof for freewheeling.

9. The driving control method of the stator-based permanent magnet field-enhanced hybrid-excitation motor capable of operating under multiple operating conditions according to claim 8, further comprising: controlling, by one H-bridge alone, an excitation current; and inputting a positive or negative excitation current by controlling four switch transistors to be on, to realize magnetic field enhancement or demagnetization of the motor; inputting, when the motor has an armature winding fault and a demagnetization fault, a single-phase alternating current into the excitation winding through the H-bridge of the excitation winding to form a single-phase alternating current magnetomotive force for working with other phase without a fault, such that the motor operates in a fault-tolerant mode; and when the excitation winding fails and a permanent magnet is demagnetized, the switch transistor is closed, and the power converter of the open winding structure operates in a switched reluctance motor control mode.

\* \* \* \* \*